United States Patent [19]
Narasimha et al.

[11] Patent Number: 5,828,670
[45] Date of Patent: Oct. 27, 1998

[54] DISTRIBUTION OF SYNCHRONIZATION IN A SYNCHRONOUS OPTICAL ENVIRONMENT

[75] Inventors: Madihally Narasimha; Kishan Shenoi, both of Saratoga, Calif.

[73] Assignee: Symmetricom, Inc., San Jose, Calif.

[21] Appl. No.: 467,313

[22] Filed: Jun. 6, 1995

[51] Int. Cl.$^6$ ........................................... H04J 3/06
[52] U.S. Cl. ..................... 370/516; 370/507; 375/293; 375/326
[58] Field of Search ............................. 370/105.3, 105.2, 370/105.1, 102, 100.1, 17, 60, 103, 507, 516, 509, 505, 503, 252, 422; 375/293, 226, 356, 326

[56] References Cited

U.S. PATENT DOCUMENTS

| | | | |
|---|---|---|---|
| 4,270,203 | 5/1981 | Collins et al. | 370/102 |
| 4,489,421 | 12/1984 | Burger | 375/112 |
| 4,494,211 | 1/1985 | Schwartz | 375/356 |
| 4,720,829 | 1/1988 | Fukasawa et al. | 371/5.1 |
| 4,890,303 | 12/1989 | Bader | 375/107 |
| 4,912,706 | 3/1990 | Eisenberg et al. | 370/103 |
| 4,998,242 | 3/1991 | Upp | 370/60 |
| 5,172,376 | 12/1992 | Chopping et al. | 370/503 |
| 5,222,102 | 6/1993 | Remson | 375/293 |
| 5,241,543 | 8/1993 | Amada et al. | 370/100.1 |
| 5,450,394 | 9/1995 | Gruber et al. | 370/17 |
| 5,499,236 | 3/1996 | Giallorinzi et al. | 370/320 |
| 5,528,609 | 6/1996 | Asano | 370/516 |
| 5,555,261 | 9/1996 | Nakayama et al. | 370/103 |
| 5,604,771 | 2/1997 | Quiros | 375/326 |

FOREIGN PATENT DOCUMENTS

| | | | |
|---|---|---|---|
| 0460835 | 5/1991 | European Pat. Off. | H04J 3/06 |

OTHER PUBLICATIONS

Lau, Richard C., and Fleischer, Paul E., Synchronous Techniques For Timing Recovery In BISDN Accepted for publication in IEEE *Transactions on Communications*, (Jul. 31, 1995).

*Primary Examiner*—Douglas W. Olms
*Assistant Examiner*—Shick Hom
*Attorney, Agent, or Firm*—Wilson, Sonsini, Goodrich & Rosati

[57] ABSTRACT

Apparatus and methods for distributing synchronization throughout a network is disclosed. The distribution of the synchronization is through the use of generating a reference timing signal, and by counting the line clock pulses between the start of a frame and the timing reference signal pulse at a first office and that count is then encoded and transmitted to the next office. At the next office, the transmitted count is decoded and used for regenerating synchronization by counting a number of received line clock pulses from the start of the frame to regenerate the reference timing signal. Particular criteria for selecting the frequencies for the timing reference signal are disclosed.

33 Claims, 11 Drawing Sheets

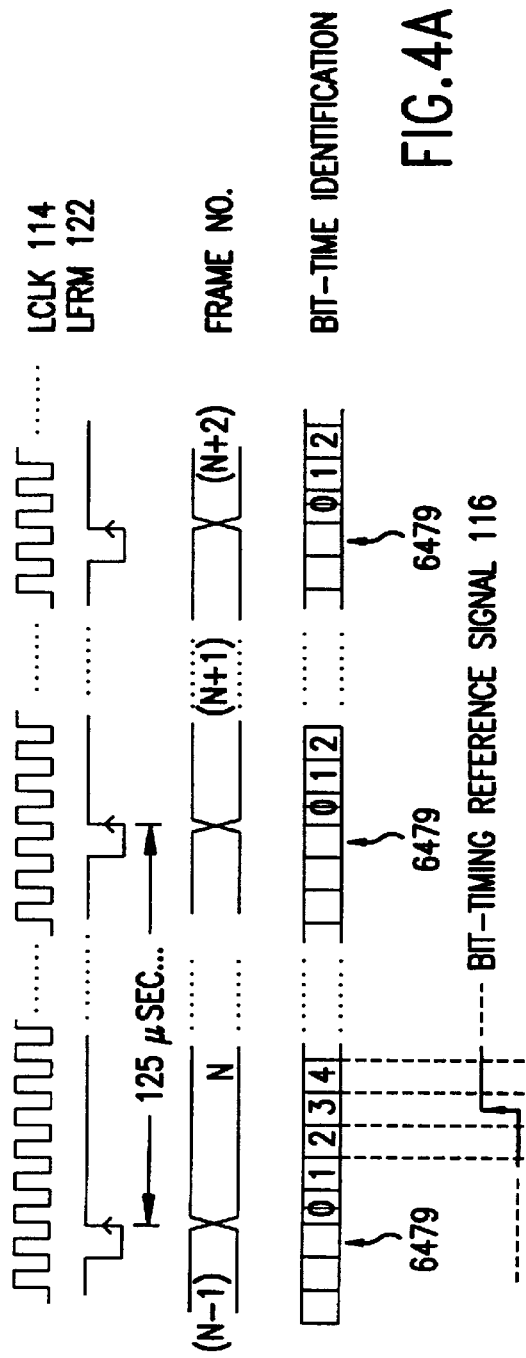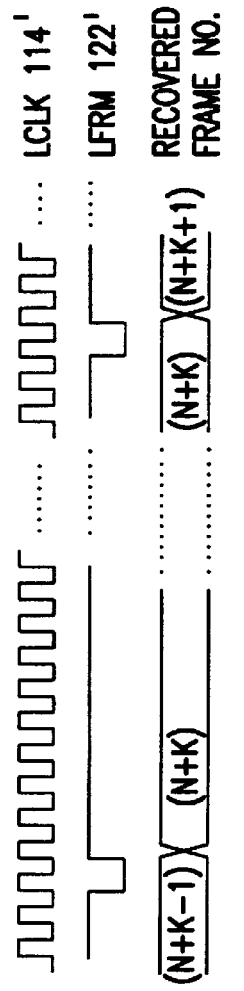
FIG. 4A
FIG. 4B

DISTRIBUTION OF SYNCHRONIZATION IN A SYNCHRONOUS OPTICAL ENVIRONMENT

BACKGROUND OF THE INVENTION

1. Field of the Invention

This invention relates to providing synchronization distribution throughout a network and in particular relates to providing this distribution in a synchronous optical communications environment prevalent in telephone networks.

2. Description of the Environment

In digital telephone networks, the network is comprised of hundreds or even thousands of offices or nodes such as shown in simplified form in FIG. 1. The network 10 has a plurality of offices 12, 14, 16, 18, 20. Each node has a local timing source 12a, 14a, 16a, 18a, 20a, commonly called a BITS for Building Integrated Timing Supply. Also, each node has a variety of equipment such as switches, optical multiplexers, channel blanks, etc. commonly referred to as network elements (NE's) 12b, 14b, 16b, 18b, 20b, with the timing for each network element within the office being supplied by the office's BITS. The various offices within the network are connected by copper or optical fiber links 22 called facilities. Unlike the earlier versions of the copper based networks where the facilities formed a mesh type network with each office being linked to multiple offices by several facilities, digital optical networks are arranged in chains or rings with facilities tying each office typically to the two adjacent offices.

Further, in a typical digital network, there are a plurality of primary reference source clocks called PRS clocks. Typically, the PRS clocks are implemented using cesium beam or GPS receiver technology. The PRS clocks serve as master clocks and provide a timing reference for the remainder of the network. The PRS timing is communicated over the facilities to different nodes to permit synchronization between various nodes within the network.

The earlier (non-standard) versions of the optical fiber network employed asynchronous bit stuffing techniques to multiplex the input tributary signals onto the optical line. The distribution of the timing reference in such a network may be realized using an embedded DS1 signal, as shown in FIG. 2. The PRS timing 30 in an office 32 is provided to the BITS 35 and then to fiber multiplexer 36 in a first office and communicated to the next office 40 over the embedded DS1 signal in the optical facility 38. Further, the fiber multiplexer 42 at the next office 40 recovers the DS1 clock 44 and passes that recovered clock to the BITS 46 of the second office and to the fiber multiplexer 48 for transmission over the next facility in the chain to the next office. Since the BITS clock 46 is not used for generating the line timing signal 50 provided to the next office in the chain (not shown), inaccuracies in the timing reference communicated to the BITS timing in intervening offices do not effect the timing reference communicated to the BITS of the successive offices. Thus, if the BITS timing reference in the second office malfunctions, the synchronization of the successive nodes or offices (not shown) in the network is unaffected. Therefore, each of the nodes or offices in the network may be thought of receiving its synchronization timing directly from the offices containing the PRS. Where each of the nodes of the network is receiving the timing reference directly from the PRS, synchronization may be thought of as being at the same level. Such distribution schemes of synchronization are referred to as being flat.

Although the method described above yields the desirable flat synchronization distribution system, it is not deployed extensively in the telephone network for two reasons. First, the bit stuffing operation performed at each node adds jitter to the embedded DS1 synchronization reference. This may render the DS1 signal unusable( as a timing reference after it traverses a few nodes. Second, and more important, the nonstandard asynchronous optical fiber systems are being replaced by the recently developed standard synchronous optical network technologies, designated as SONET or SDH. The method of distributing the synchronization reference using an embedded DS1 signal does not work properly in the SONET environment, as explained below.

In a SONET multiplexer, the output optical line clock is normally synchronized to the office BITS clock. The rate variations between the input tributaries and the output line signal are accommodated by a byte stuffing process known as pointer adjustment. The eight bit phase movements caused by the pointer adjustments can be large enough to render the embedded DS1 timing reference incapable of adequately transporting the synchronization information. Hence, the standards organizations (ANSI and the ITU) recommend that a DS1 signal embedded within a SONET line signal not be used for synchronization distribution. Instead they recommend the use of the recovered optical line clock to generate a derived DS1 synchronization signal. This derived DS1 signal serves as the synchronization reference input to the office BITS clock.

The use of the derived DS1 to distribute synchronization references, however, implies a hierarchical synchronization network. In such a network, the BITS clock at an intermediate node is not synchronized directly to the PRS but is instead synchronized to the timing reference supplied by the BITS clock in the previous node. This hierarchical scheme for the distribution of synchronization signals has marry shortcomings.

First, administrative controls are required to ensure that a higher quality BITS clock (lower stratum number) does not accept timing from a lower quality BITS clock. Second, the cascade of clocks created by the hierarchical chain can impair the timing reference traversing the network. Third, if a BITS clock fails anywhere in the chain, all the downstream clocks will lose synchronization. And finally, this scheme is prone to the inadvertent creation of timing loops, especially under facility failure conditions. (A timing loop occurs when timing from a first node is passed to the second node and then the timing is fed back through a chain of one or more additional nodes to the first node so that the first node is synchronizing its timing to itself. Such a situation is clearly undesirable since all the nodes involved in the timing loop will be isolated from the PRS).

Synchronization messaging is a solution recommended by the standards organizations to alleviate some of the shortcomings delineated above. In this method, the status of the clock that generates the timing reference at a particular node is communicated to the clocks and network elements at other nodes over a messaging channel. The clocks at these other nodes will then decide, in an intelligent manner, whether they should synchronize to one of the incoming timing references, or whether they should operate in a holdover mode. However, the synchronization messaging scheme does not cure all the problems created by the hierarchical synchronization distribution network. Furthermore, implementation of this messaging scheme will be expensive as it involves the retrofitting of the existing BITS clocks and the SONET network elements to provide this capability.

Therefore, it is the first objective of this invention to provide a method for transporting network synchronization reference signals over the existing SONET network using a flat distribution scheme. It is a second objective of this invention to distribute these synchronization reference signals without incurring the problems associated with the hierarchical scheme. It is yet a third objective of this invention to achieve the flat synchronization distribution system without requiring substantial hardware investment or retrofitting costs.

SUMMARY OF THE INVENTION

These and other objects are achieved by relying on two timing elements available at each office: the line clock and the SONET frame timing. A timing reference signal synchronized to the PRS and at a frequency that is at least slightly less than the frame rate is generated at the originating PRS site. The line clock is then used to determine the interval between the start of the frame and an edge of the timing reference signal. This timing difference is encoded and transmitted in an overhead channel and may be decoded at the next node. The next node may then recover the timing reference for use in its own BITS timing and for transmission on to the next node.

Therefore, a flat synchronization structure is created as each node in the network depends for its timing upon the original PRS instead of the intervening nodes. Further, this flat structure eliminates any possibility of timing loops.

To fit this approach in existing network structures without substantial hardware costs, a few counters, flip-flops, and gates can be used to generate all of the timing signals. To reduce messaging overhead, the encoded timing difference can be transmitted over multiple frames in currently used control bytes reserved in the SONET architecture.

DESCRIPTION OF THE DRAWINGS

FIGS. 4A and 4B are timing diagrams relating to the embodiment of FIG. 3.

DETAILED DESCRIPTION OF THE INVENTION

Figure 1:
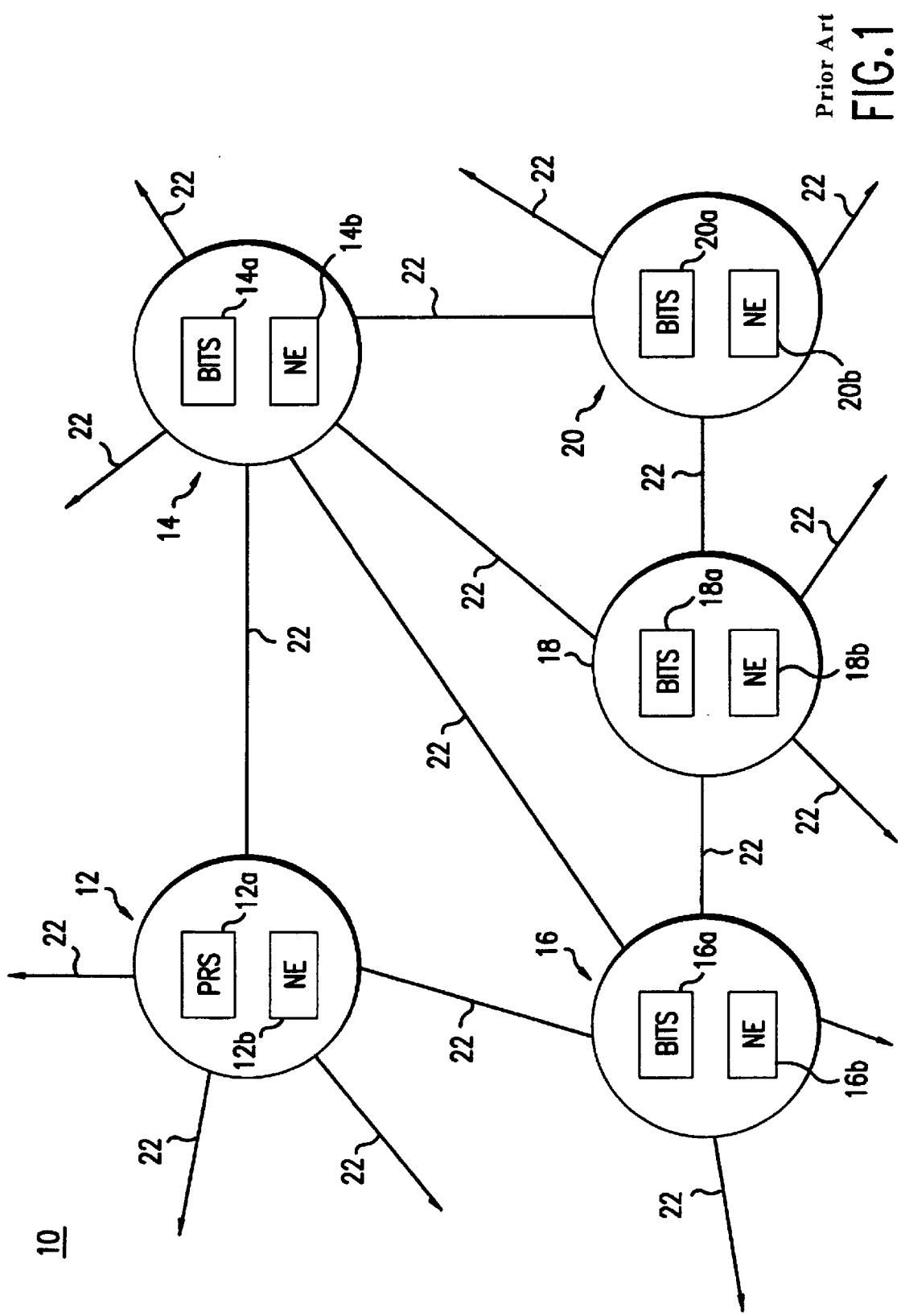
FIG. 1 is a diagram of a simple prior art telephone network.
Figure 2:
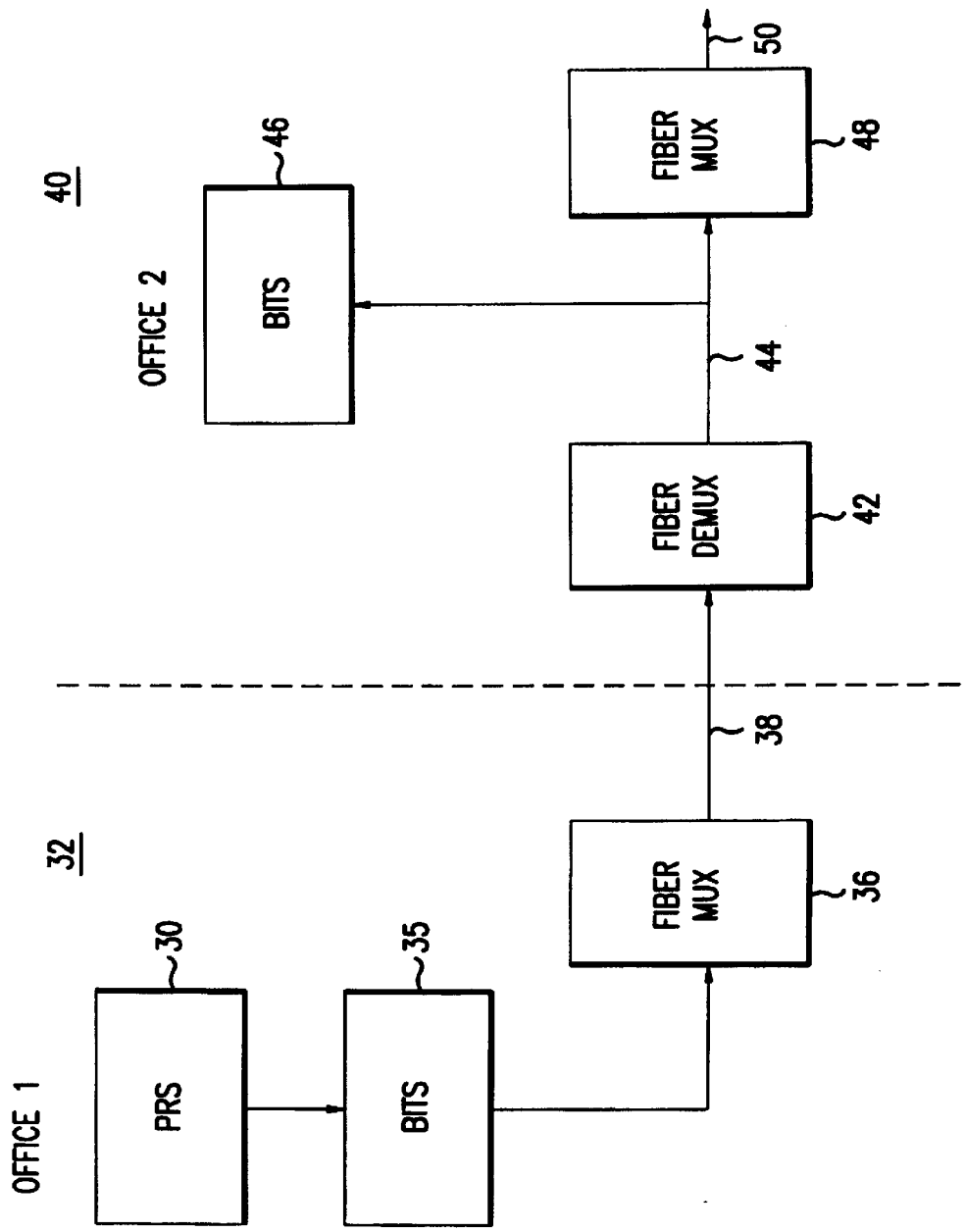
FIG. 2 is a diagram of the synchronization distribution scheme in a prior art asynchronous network.
Figure 3:
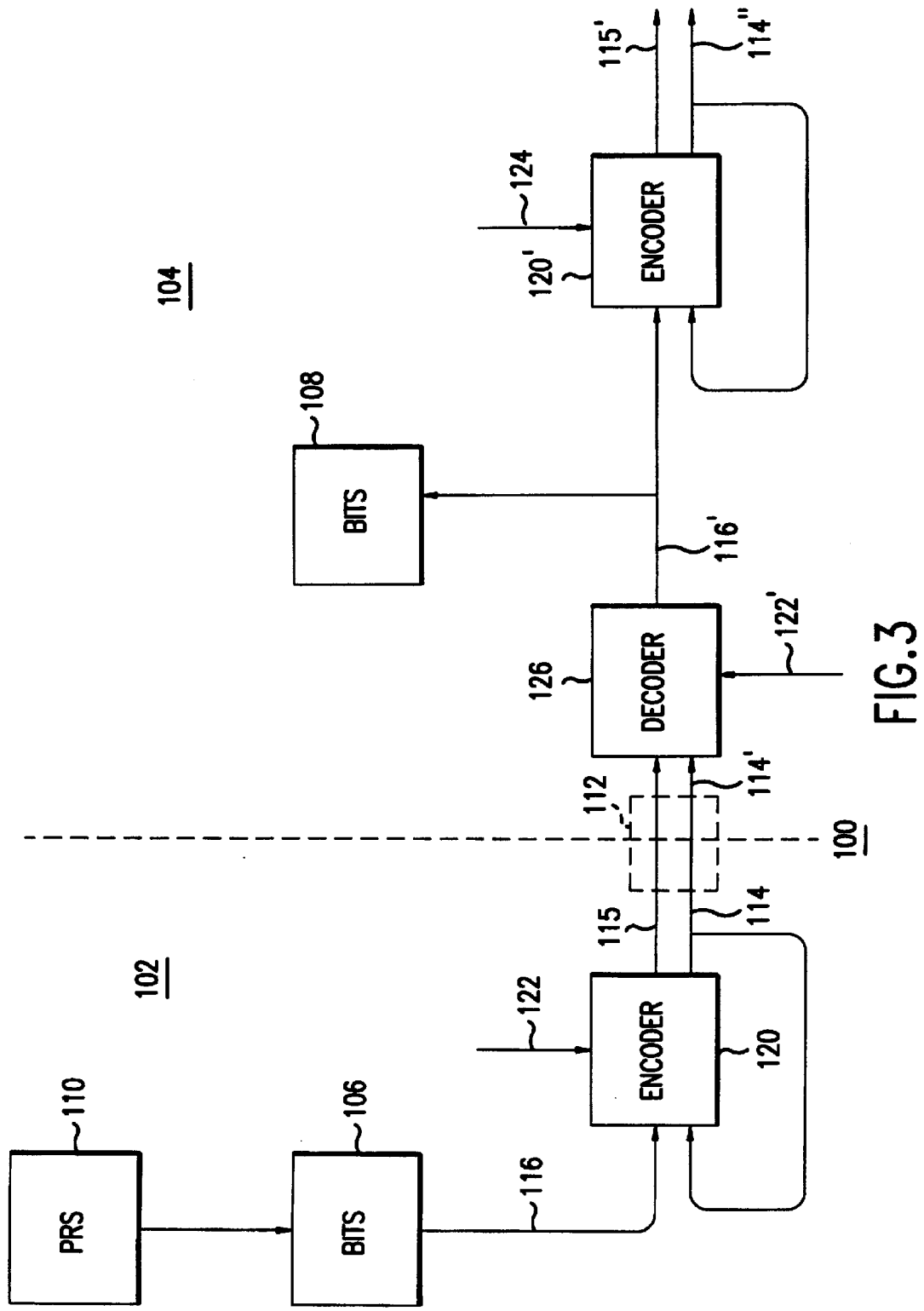
FIG. 3 is a block diagram for an encoder and a decoder for an embodiment of the invention.

The embodiments of the invention involve transmission of synchronization of timing. FIG. 3 is useful in explaining an embodiment of the invention, as applied in a SONET or similar synchronous optical environment. A portion 100 of the network is shown in FIG. 3. Each node or office 102, 104, in the network has a BITS clock source 106, 108 and at least one node has a PRS 110 directly controlling the BITS timing 106 at the same office 102. Each node receives and transmits a line clock LCLK 114 over a facility such as an optical fiber 112 linking nodes. Each node also receives and transmits frames at a nominal rate of eight thousand times a second with the frame containing control information and data according to the established network protocol. In the SONET environment, the duration of a frame is nominally one hundred twenty five microseconds. A locally generated timing reference signal 116 generated from the BITS timing signal (the BITS timing signal is nominally a 1.544 MHz signal in SONET) is also provided in each node having a PRS. Also generated internally by the office or node 102 is a frame start signal LFRM 122. The frame start signal and the line clock can be obtained from the add-drop multiplexer (ADM, not shown) at the office.

An encoder 120 measures the difference in timing between the start of the frame as indicated by the frame start signal, signal LFRM 122 and the timing reference signal 116. This timing difference may be obtained by counting the line clock pulses between the start of the frame as indicated by LFRM 122 and a pulse edge of the locally generated timing reference signal. The timing difference represented by this count may be encoded into reserved control bytes of the message frame 115 and may then be transmitted over the facility 112 to the next office 104 in the SONET chain or ring. At this second office, a decoder 126 uses the transmitted line clock 114' that has been transmitted from the office 102 and recovered in the office 104 by the ADM (not shown) along with a line frame start signal 122' that has been reconstructed by the office ADM according to well known techniques in the art. In a manner explained below, the local timing reference signal 116' can be regenerated, for example, by multiplying the period of the line clock LCLK 114 by the transmitted count 115 to generate a pulse in a manner that will be described in more detail below.

That regenerated timing signal 116' may then be supplied to a further encoder 120' that also receives the start of the frame signal 124 generated by the office for the frames to be transmitted. The line clock 114" for transmission to the next node in the chain of the network (not shown) is also provided to the encoder 120' from the ADM (not shown). The difference between the start of the frame pulse LFRM 124 and the regenerated timing signal 116' may be counted with the line clock to provide a further count 115' for transmission over the facility (not shown).

FIG. 4A shows a timing chart relevant to time measurement at the first office 102. The 51.84 MHz line clock LCLK 114 provides the fundamental reference for counting periods or bit times for the time measurement. The start of each successive frames N−1, N, N+1, N+2 is indicated by the rising edge of a pulse in the frame start signal LFRM 122. Since a frame has a duration of 125 microseconds, there are 6480 possible periods of the line clock LCLK in which an edge of the timing reference signal 116 can occur. In the instance in frame N, the edge occurs during the fourth bit time measured in units of the 51.84 MHz clock so a count of four would be encoded. During the next frame (N+1) or some subsequent frame, that count may be transmitted to the next node 104 over the link 112.

Upon receipt of the count, the next node 104 in the network will generate a rising edge of a reconstructed timing reference signal 116' at the start of the fourth received bit time in the N+K frame as shown in FIG. 4B. In particular, the decoder 126 will receive the regenerated line clock LCLK 114' generated by the ADM at the office 104 and count a number of cycles of that clock equal to the received count. At that point, the decoder will generate an edge in a regenerated timing reference signal 116' that may be used in the office 104 for synchronizing the BITS 108 to the PRS 102. In addition, the line clock, the regenerated timing signal 116' and the local frame start signal 124 from the second office's 104 SONET ADM (not shown) may be used for measuring the difference and transmitting a count to the next office so that it may also generate a local version of the timing signal. Since each version of the timing signal is only dependent upon the PRS timing and not the BITS timing of each local office in the chain, distribution of the timing tied to the timing reference is flat and avoids both timing loops and hierarchy problems.

Figure 5:
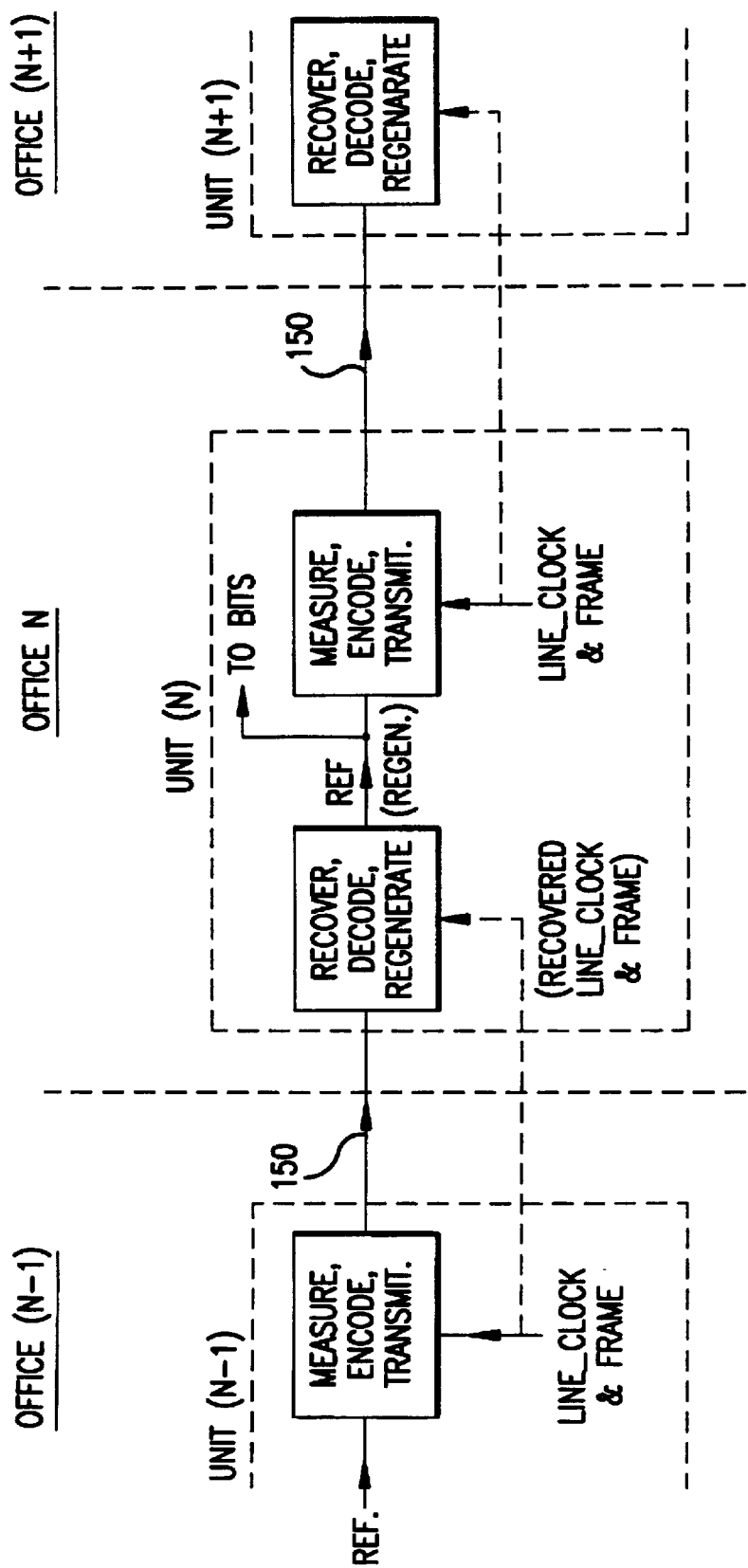
FIG. 5 is a functional flow diagram for the embodiment of FIG. 3.

FIG. 5 shows a functional flow diagram of distribution of timing throughout the network. Successive offices N−1, N and N+1 in a network perform the function of measuring the timing difference between a timing reference signal and the line clock and the start of the frame using the transmit line clock. The measured time difference at node N−1 is encoded and then transmitted over a link 150. At the next node, or office N, the line clock and the frame timing are recovered, the transmitted count is decoded and used to regenerate the timing reference signal. This regenerated timing reference signal is supplied to the BITS at office N for synchronization. This regenerated timing reference signal at office N is also supplied for measuring the timing difference with the start of the frame at office N to be transmitted to the next node using the transmit line clock and frame timing of office N. The timing difference measured at office N is encoded and transmitted over the facility for subsequent recovery, decoding and regeneration at office N+1 in a like manner.

Selection of the appropriate criteria for the local timing reference signal is based upon several factors. First, the local timing signal pulse edge should occur no more than once each frame. Therefore, the local timing signal should have a rate of less than or equal to the frequency of a frame; e.g., 8 KHz in a SONET network. However, since the frame rate may be at a slightly lower rate and still be within the SONET specification, the local timing reference signal should preferably occur at a rate that is less than the minimum permitted frequency of the frames. Further, the frame rate and the timing signal rate should not be harmonics of each other. Optimally, they should be "as prime as possible" with respect to the measurement rate of the line clock, which is 51.84 MHz. In particular, the highest common factor of the frame rate of 8 KHz and the timing reference signal should be as low as possible to prevent the development of beats occurring with such sampling with the line clock. In addition, the timing rate signal should preferably be at a frequency readily obtainable from frequencies in the office such as the BITS signal. For this reason, a timing rate of 7.72 KHz or an integral submultiple thereof (i.e., 3.86 KHz, 1.93 KHz, 0.965 KHz) are among the preferred frequencies for a SONET network. These frequencies can be readily generated from the 1.544 MHz BITS timing signal available in each office since 7.72 KHz is obtained readily by dividing the BITS signal by two hundred. In fact, for reasons discussed later, 1.93 KHz may preferably be used for optimal encoding in an overhead byte for transmission over a SONET network.

A further advantage of the 7.72 KHz timing signal or some integral submultiple thereof is avoidance of metastable states resulting from the synchronous nature of the various signals and the switching speed of the digital logic involved. In particular, with the line clock of 51.84 MHz, there is a window around each edge of the line clock in which the occurrence of an edge of the timing signal may not be detected due to the transistor switching delays inherent in the digital logic. Such metastable conditions would result in a delay in detecting the edge and hence inject a one clock period pulse offset in detecting the count representing the occurrence of the timing edge. If a signal having the same frequency as the frame rate, or harmonic thereof, is selected, this metastable condition can persist over a substantial period of time. With the selection of 7.72 KHz or an integer submultiple of that frequency, any metastable events will be one time events that can readily be eliminated at the next office through the use of a phase lock loop in the generation of the timing reference signal. By use of 7.72 KHz or integer submultiples of 7.72 KHz, the edge to edge change in the timing reference signal ensures that if a timing signal edge occurs in the metastable region of the edge in the line clock for the logic, the next occurrence of the timing reference signal edge will not be during the metastable region.

Figure 6A:
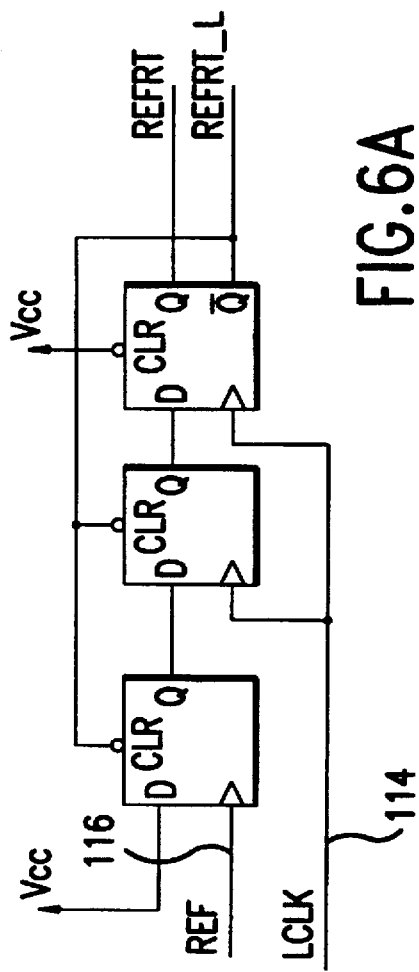
FIGS. 6A and 6b are schematics of circuits for retiming the timing reference signal at the encoder.
Figure 6B:
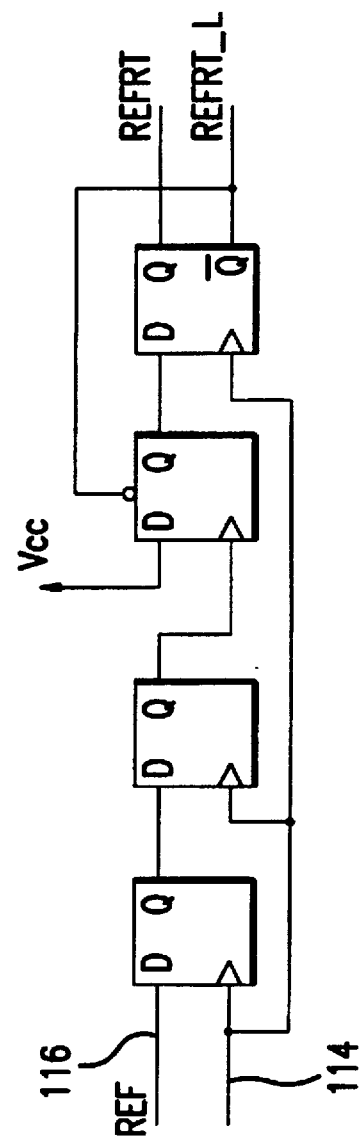

FIGS. 6A through 11 show various circuitry and associated timing diagrams for generating and regenerating the timing reference signal at the various nodes throughout the network. It is assumed that in each of these circuits, the circuit components are synchronous. First, the timing signal REF should preferably be retimed to the timing of the line clock LCLK. FIG. 6A shows a circuit for generating such retiming while reducing the likelihood of a metastable condition. The circuit comprises three edge triggered D flip-flops and the retimed timing signal output is REFRT and its complement, REFRT_L. FIG. 6B shows an alternative version of such a circuit.

Figure 7A:
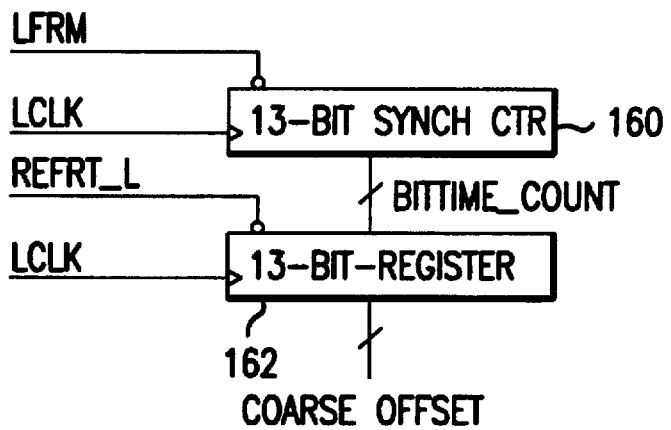
FIG. 7A is a schematic of a circuit in the encoder for measuring the timing difference between the start of the frame and the timing reference signal.
Figure 7B:
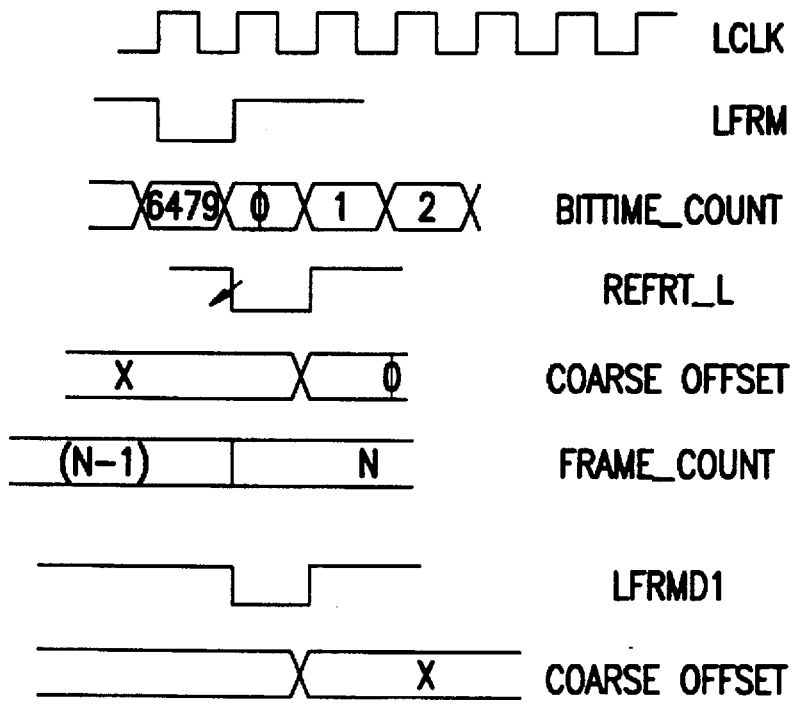
FIG. 7B is the timing diagram for FIG. 7A.

FIG. 7A shows a circuit for generating the count representing the timing difference in units of the line clock LCLK period between the pulse indicating the start of the frame N in signal LFRM, and the retimed timing reference signal. The rising edge of the start of the frame signal LFRM resets a thirteen bit counter 160 that counts the line clock LCLK. When the falling edge of the complementary retimed timing signal pulse RFRT_L occurs, it enables the input of a thirteen bit register 162 that is coupled to the output BIT TIME COUNT of the synch counter 160 and the line clock LCLK. The current value from the counter is clocked at this point into the shift register. The contents of this register, labelled COARSE OFFSET, represent the timing delay between the LFRM frame pulse and the retimed timing signal in units of time defined by the LCLK period. The contents of the counter are held in the register until the next edge of the retimed timing signal. FIG. 7B depicts the associated timing diagram.

Figure 8:
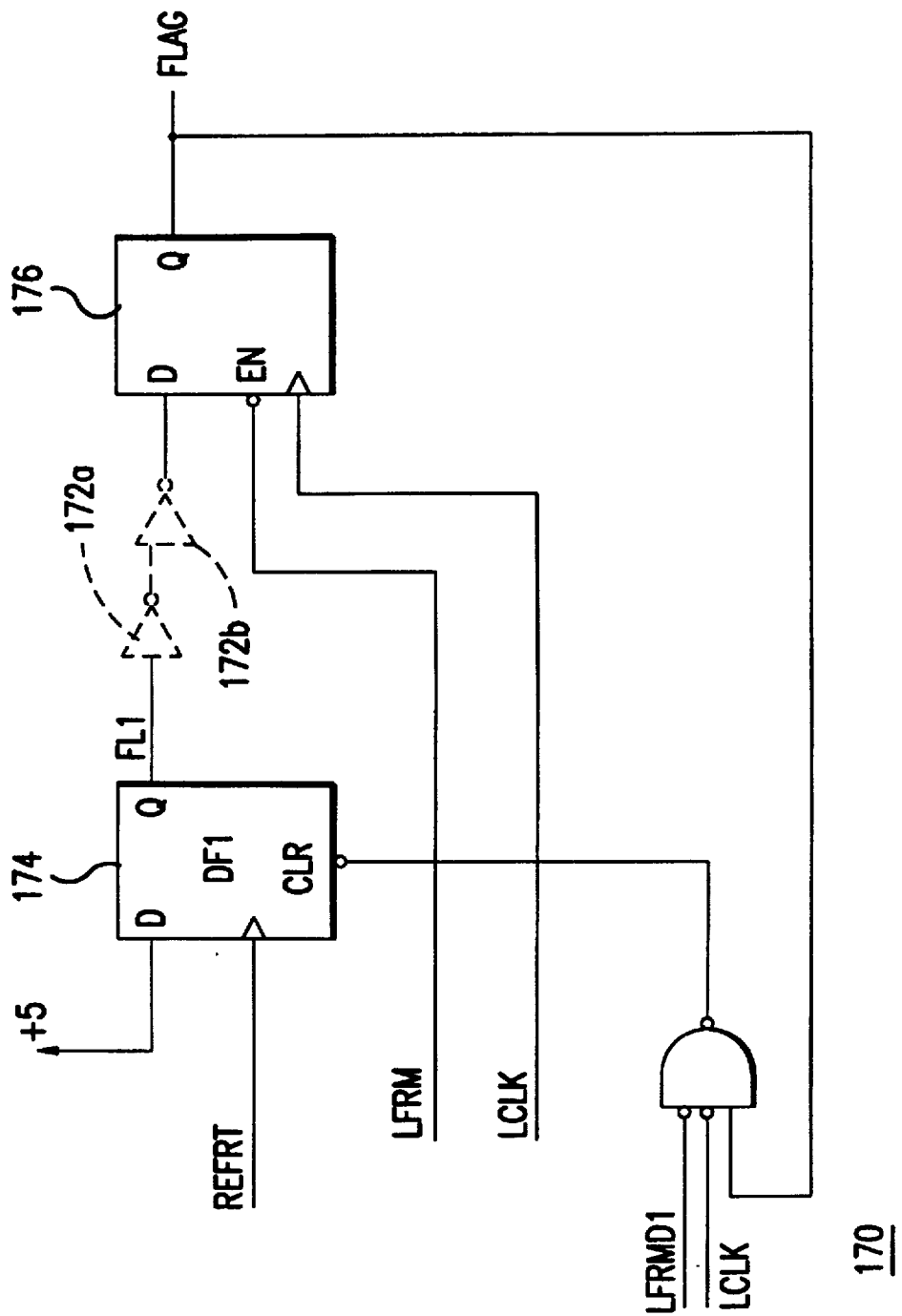
FIG. 8 is a schematic of a circuit in the encoder for generating a flag to indicate in which frame an edge of the timing reference signal has occurred.

Since the retimed timing reference signal may not have an edge in each frame, a flag indicating when an edge has occurred is needed. FIG. 8 shows a circuit that is useful for generating the flag signal to indicate that an edge in RFRT_L occurred during the current frame. The circuit 170 receives the line clock LCLK, the retimed timing reference signal REFRT, the start of the frame signal LFRM, and a start of the frame signal delayed by one line clock period LFRMD1. Optionally, two inverters 172a and 172b may be provided between D flip flops 174 and 176 that generate a flag signal FLAG indicating an edge of the timing reference signal has occurred with a true value indicating a flag has occurred.

Figure 9A:
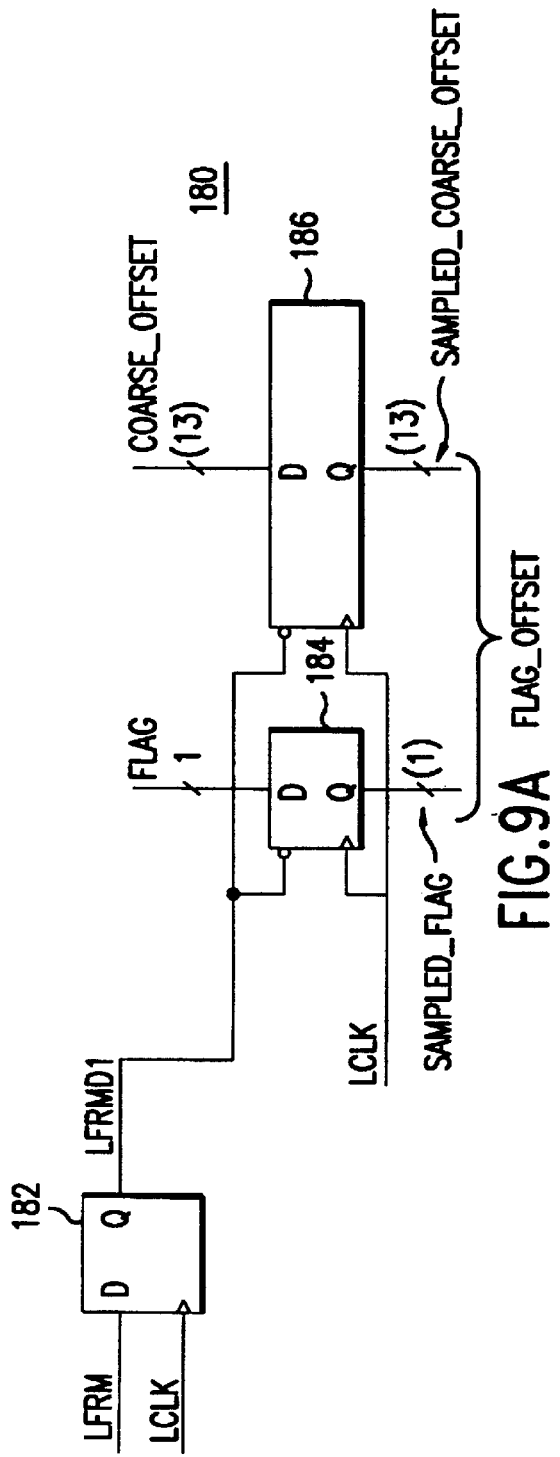
FIG. 9A shows a circuit in the encoder for sampling the measured timing difference and the flag.
Figure 9B:
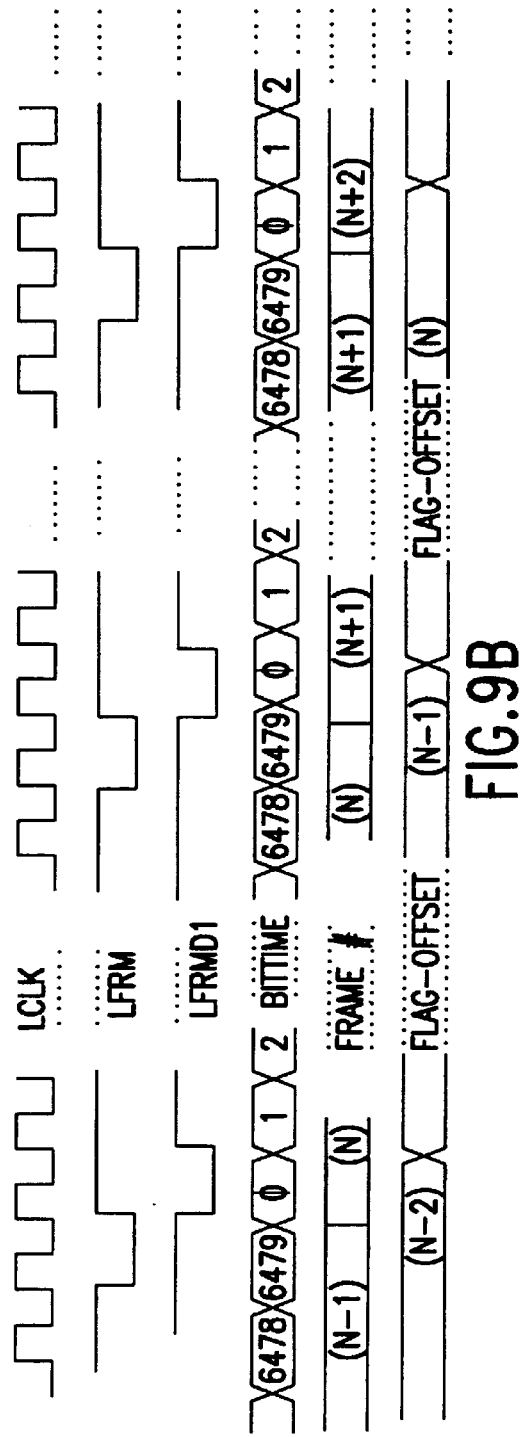
FIG. 9B is the timing diagram for FIG. 9A.

For subsequent transmission to the next node, the stored count must be sampled for encoding and transmitting. The flag and the coarse offset value are then stored as a fourteen bit word as shown in FIG. 9A. The frame start timing signal LFRM is delayed by the line clock LCLK in a flip flop 182 to provide the LFRMD1 signal and that LFRMD1 signal enables a D flip-flop 184 and a register 186 circuit that receive as their inputs the FLAG and COARSE_OFFSET values. These two values are gated with the line clock LCLK for processing during the subsequent frame to provide the sampled fourteen bit entity FLAG_OFFSET. The FLAG_OFFSET comprises SAMPLED_FLAG and SAMPLED_COARSE_OFFSET. As shown in the timing diagram FIG. 9B, the FLAG_OFFSET value lags one frame behind where the edge of the retimed timing reference signal RFRT occurs (assuming an edge occurred during the prior frame).

If the resultant sampled coarse offset value has the sampled flag high, that count value may then be processed by the office network element, such as an ADM, for transmission over the network to another node on the network according to the network protocol. For example, using the current SONET protocol, the network has a overhead byte called the F1 byte that is unused and reserved for future applications. Therefore, it is possible to use the F1 byte for transmitting the synchronization information.

Given that the synchronization count (COARSE_OFFSET) uses the SONET standard of an 8 KHz frame rate and a line clock of 51.84 MHz, the coarse offset requires thirteen bits to transmit the maximum possible count of 6479. Therefore, at a minimum, two F1 bytes in two separate frames may be used for transmitting the information.

However, for coding accuracy, it is more desirable to transmit the information over four frames and therefore use four F1 bytes to permit error detection. Therefore, to match this transmission rate of four frames, the frequency of the timing reference signal should be 1.93 KHz or some integral submultiple of that rate. The timing edge that occurs in Frame N, is actually encoded and transmitted in a four frame sequence over the next four frames, N+1, N+2, N+3, and N+4. Regeneration of the edge at the receiving node when using this algorithm will occur at a minimum of five frames after the edge occurred at the transmitting node.

A possible format for the F1 bytes is shown in table I below:

| Byte No. | MSB | Bit 6 | Bit 5 | Bit 4 | Bit 3 | Bit 2 | Bit 1 | LSB |
|---|---|---|---|---|---|---|---|---|
| 0 | 0 | $Edge_1$ | $Edge_2$ | Coarse Offset 5 LSB | | | | |
| 1 | 0 | $Edge_1$ | $Edge_2$ | Coarse Offset Next 5 Bits | | | | |
| 2 | 0 | $Edge_1$ | $Edge_2$ | Coarse Offset 3 MSB | | | X | X |
| 3 | 1 | X | X | CRC | CRC | CRC | CRC | CRC |

According to this format, the most significant bit in each of the first three F1 bytes is set to a logical zero and the most significant bit for the last byte is set to 1 so that the last byte of a four frame sequence can be readily detected. Alternatively, the MSB of the first byte may be set as one to mark the start of a sequence and the three remaining bytes may be set to zero. Further, the fifth and sixth bits in the first three F1 bytes of a four frame sequence are called edge data and are used for determining during which frame of the prior four frame sequence an edge of the retimed timing reference signal occurred.

In this implementation, the receiving node office compares the edge data in each of the first three F1 bytes of a four frame sequence. Either a majority rules or a requirement of all three edge bit patterns being the same may be used to determine in which frame the edge occurred. Transmitting different values for each of $Edge_1$ and $Edge_2$ for each of the first three frames for the four frame sequence can be used to indicate that no edge occurs during the four frame sequence, a link has been broken so synchronization to the PRS has been lost or a phase slippage greater than the predicted amount has occurred. In addition, various such error conditions can be passed between the nodes by encoding such error conditions in the bits labelled with X.

The value of the coarse offset is encoded into the first three F1 bytes of the four frame sequence. Also, a cyclic redundancy check (CRC) sequence, or some other error detection mechanism, is transmitted in the F1 byte of the fourth frame for detecting transmission errors in the transmitted Coarse Offset.

The bits labelled with X may be used for a variety of optional functions. For example, such bits may be used with the bits indicated as CRC for transmitting a nine bit error correction code instead of a CRC. A predetermined bit pattern for these bits may also indicate a phase slippage at the transmitting node that is greater than a predetermined threshold or the like to prevent propagation of phase errors. Detection of such errors is readily possible by either the transmitting or receiving office. In response to such conditions, the receiving office may disregard the transmitted count for a four byte sequence.

For example, the receiving office may compute an expected range of values for the received coarse offset based upon the relative frequency of the frame and the timing reference signal. The receiving office may disregard the received coarse offset if the value is beyond the expected range.

Figure 10A:
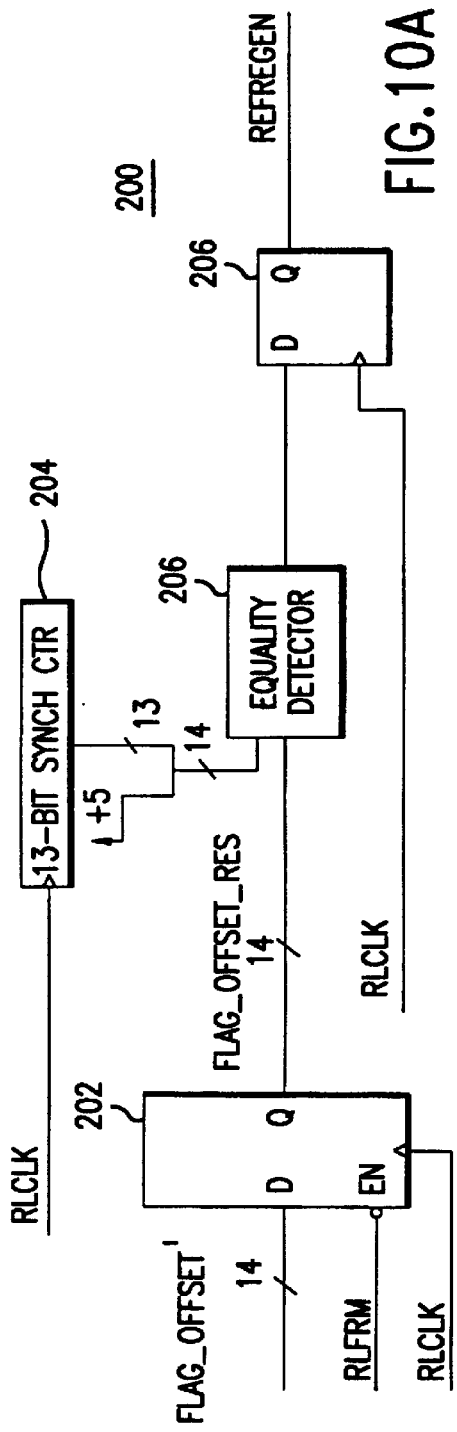
FIG. 10A is a circuit in the decoder for generating the timing reference signal in the decoder.
Figure 10B:
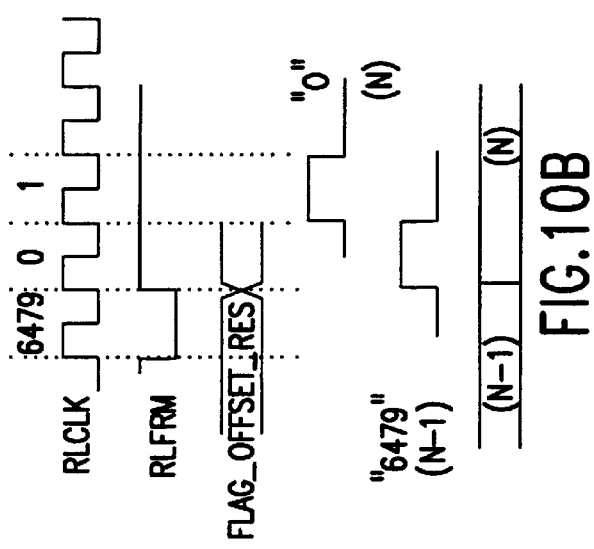
FIG. 10B is the timing diagram for FIG. 10A.

At the receiving node where the timing difference information (the encoded coarse offset count) is received, the timing difference information can be used to regenerate a timing reference signal with the use of the circuit 200 shown in FIG. 10A. In particular, the regenerated received and recovered line clock RLCLK and the regenerated received frame signal RLFRM are provided from the receiving office ADM (not shown). The transmitted F1 bytes are decoded by the receiving office in the chain to provide a reconstructed version of FLAG_OFFSET. This regenerated flag signal can be based upon the edge bits in each of the first three F1 bytes in the transmitted four frame sequence. Either a majority rules protocol or a requirement of all three sets of edge bit patterns matching can be used for determining in which frame the edge occurred. To match the flag signal at the equality detector, a logical "1" is also provided so that the pulse will be generated during the appropriate frame. The coarse offset can be obtained by concatenating the three portions of the coarse offset transmitted in the four-frame sequence.

The decoded FLAG_OFFSET is clocked into a register 202 that is enabled by the reconstructed start frame signal. Simultaneously, a thirteen bit counter 204 is counting the regenerated line clock RLCLK. Both the output of the counter 200 and the register 202 are provided to an equality detector 206. The equality detector can then provide a pulse when the count contents and the "one" to match the flag and the contents of the register are equal.

The pulse from the output of the equality detector can then be provided to a D flip flop 208 to provide the regenerated timing reference signal REFREGEN. This regenerated timing signal is provided at least two frames plus one regenerated line clock period after the timing edge occurred. If the format described above using four frames for transmission of the timing difference is used, the delay will be at least five frames plus the one regenerated line clock period. Any other delays inherent in communications between the two offices may increase that delay. Nonetheless, such a regenerated reference timing signal does permit transmission of synchronization throughout a network in the manner described for FIGS. 3–5 above.

Further, although the use of the line clock at 51.84 MHZ provides a granularity of about twenty nanoseconds (the period of the line clock) with which to measure synchronization, this granularity can be reduced. To reduce the granularity, one may provide the recovered timing reference signal REFREGEN to a digital phase lock loop with a very narrow bandwidth, for example about one hertz. The granularity of the sampling of the frequency with the line clock results in a poisson like distribution of error in the sampling of the phase relationship between the timing signal and the start of the frame pulse. A narrow bandwidth filter over the long term filters out virtually all of the phase error due to this poisson like distribution arising from the granularity assuming the PRS signal is highly stable; i.e., maintaining an accuracy in one part of $10^{13}$ over the course of a day. Thus, the use of such narrow bandwidth phase lock loops results in a much more tightly controlled synchronization once the phase lock loop has stabilized.

In particular, with a line clock at about a period of twenty nanoseconds, the best phase synchronization that could be attained would be on the order of twenty nanoseconds. However, by employing a one hertz bandwidth phase lock loop the phase error over the long term can be reduced to about one percent of this granularity on or about the order of 0.2 nanoseconds. This phase lock loop can also be used for generating the 1.544 MHz timing reference signal required by the BITS clock at the node using a standard frequency multiplier configuration.

Further, to achieve phase lock during start up or after various transient conditions, it is preferable that the bandwidth of the filter be adaptive as is readily possible with digital filters. During start up or after various transient conditions, the bandwidth of the loop is opened up, permitting faster acquisition of phase lock.

Upon detection of errors in either the CRC or upon detection of the predetermined bit pattern in any of the bits indicated with an X in Table 1 above indicating an error condition, the receiving node can go into a holdover node. Also, for such holdover conditions, the regenerated value can be ignored by the phase lock loop and the system can resort to the predicted values that may be generated by knowing the frequency of the frame rate and the timing reference signal. Alternatively, with such phase lock loops, the loop can be held at a nominal frequency until the cause of the holdover condition is alleviated.

Figure 11:
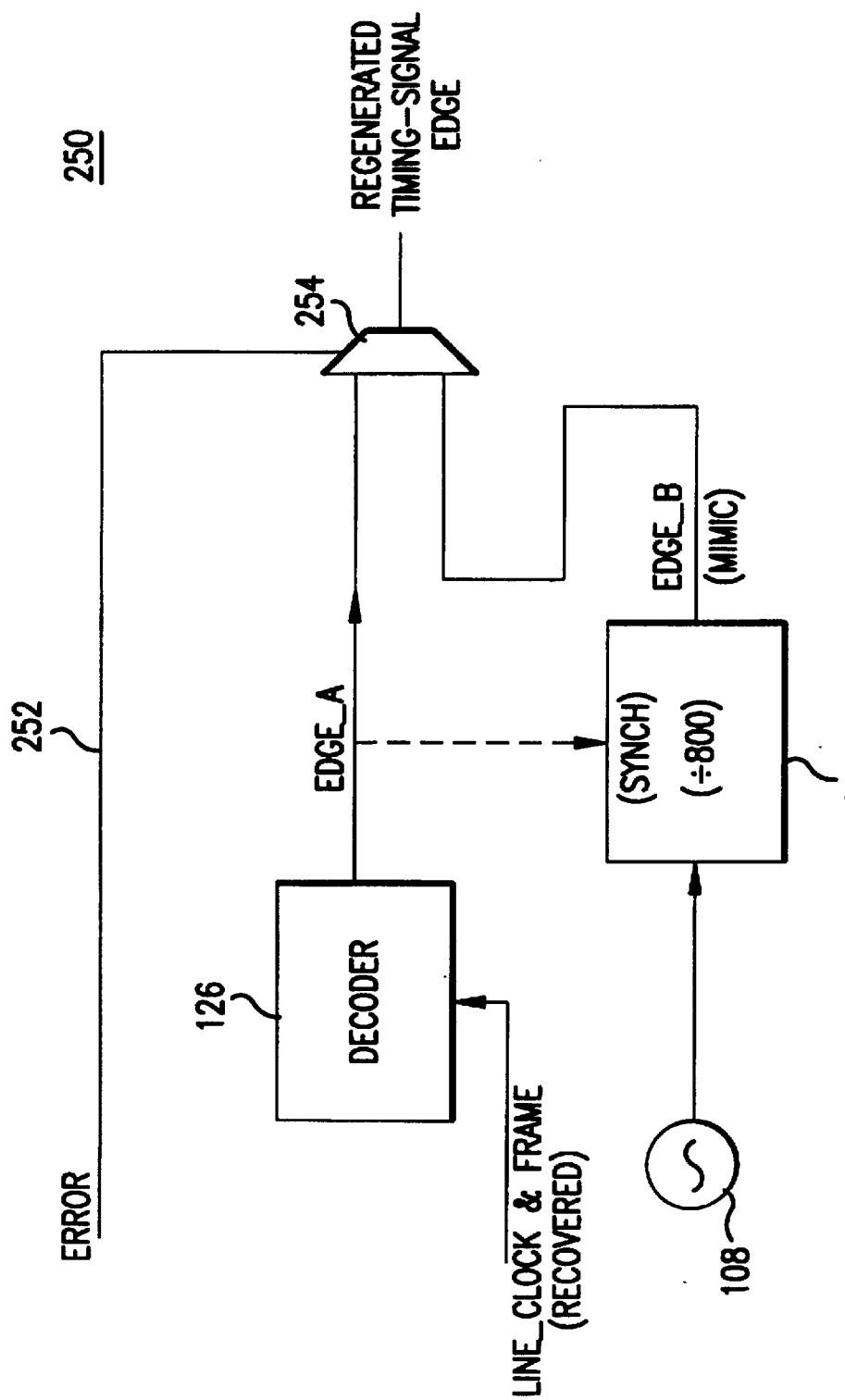
FIG. 11 is a circuit for generating a substitute for the timing reference signal when certain error conditions are detected.

Also, the BITS clock can also be used for providing the timing signal temporarily when there is an error condition in the encoded coarse offset information, or the edge information, as shown in FIG. 11. If an error is detected by the receiving office in the CRC, the edge bits, or a sudden change in the coarse offset value from a predicted value shows a loss of synchronization at the transmitting office, the office generates an error signal 252. The output of the decoder 126 is provided to one input of a multiplexer 254. The other input is provided by dividing down the BITS clock 108 by eight hundred with divider 256 where the output of the divider is synchronized to valid rising edges of the regenerated signal according to well known techniques. The output of the divider 256 is coupled to the other input of the multiplexer 254 to provide a temporary backup version of the regenerated timing signal. Therefore, whenever the office detects an error condition, the error signals 252 can select the temporary back up signal to provide the regenerated timing signal 114.

For propagation of synchronization throughout the network, each node not serving as a master clock source can both receive and regenerate the timing reference signal and also generate a timing reference signal and transmit the difference between that generated timing reference signal and the frame. Since each node in the network receives and regenerates the same synchronization information, the network architecture is essentially flat. Further, timing loops are eliminated due to the usage of such a flat architecture.

Although a particular embodiment of the invention is disclosed, alternatives would be readily apparent to those of skill in the field. Different frequencies for signals are, of course, appropriate for different networks such as OC-N or SDH where line clock frequencies are integer multiples of 51.84 MHz or 155 MHz, respectively. In fact, a 19.44 MHz clock, which is readily available in many implementations, may also be used, instead of the actual line clock, to measure the timing difference. Also, different protocols can be used for encoding and transmitting the timing difference signal. Instead of using counters to generate the timing difference various types of analog and digital phase detectors may be used. Alternatively, the regenerated timing signal could also be obtained through the use of a high precision numerically controlled oscillator controlled by a microprocessor using the coarse offset information to generate the timing reference signal at the output of the oscillator. In addition, while the disclosed embodiments use the start of the frame as a reference for generating the timing difference, other specific times in the frame may also be used for generating the timing difference with the local timing reference signal.

Further, instead of using the PRS as an original source for the synchronization signal to be distributed, other sources may be used such as the disciplined time scale generator disclosed in U.S. patent application Ser. No. 08/278,423 to Zampetti, pages, 9–26 of which are incorporated herein by reference. By equipping occasional offices in the chain with such timescale generators that are disciplined to a universal time scale such as GPS or LORAN, a highly synchronous network is established without requiring the expense of numerous PRS clocks or disciplined time scale generators at each office. Resort to the scope of the invention should be through the claims.

We claim:

1. A method of passing synchronization through a network comprised of a plurality of nodes communicating with each other at a predetermined frame rate, the nodes communicating with each other through frames having predefined starts and with a line clock, the communication occurring by transmitting the frame and the line clock between nodes, the method comprising:

generating at a first node a local timing reference signal at a frequency that is less than the frame rate;

determining with the line clock at the first node the timing difference between a predetermined time of the frame and the local timing reference signal; and transmitting the timing difference to at least one other node in the network.

2. The method of claim 1, wherein the method further comprises:

determining the time of the frame and recovering the line clock at a second node coupled to the first node;

regenerating the timing reference signal based upon the transmitted timing difference.

3. The method of claim 1, wherein the frequency of the local timing reference signal is selected to minimize the occurrence of the metastable states in successive cycles of the timing signal.

4. The method of claim 1, wherein the net work is a SONET network and the SONET network frame includes an F1 byte, the transmission of information indicating each timing difference occurs over multiple frames in the F1 byte.

5. A method for maintaining synchronization in at least a portion of a network of a plurality of nodes, the network having a reference timing signal, each node in the network communicating with at least one other node in the network through frames having frame timing and each node generating a line clock and frame timing for communication with at least one other node, the method comprising:
- at at least one first node generating a local timing reference signal based at least in part upon the network reference timing signal;
- measuring the difference in timing at the first node between the frame timing for at least some frames being transmitted and the local timing reference signal;
- transmitting in at least some frames to at least one second node from the first node the measured time difference; and
- generating at the second node with the line clock, the frame timing and the transmitted measured time difference a reconstruction of the local timing reference signal such that at least one reconstructed local timing reference signal is synchronized to the network reference timing signal.

6. An apparatus for aiding the distribution of synchronization throughout a network comprising a plurality of nodes, each node generating a line clock having clock pulses at a predetermined frequency for transmitting information to another node and each node transmitting according to frames having a period based upon the timing of the frame that is being transmitted, the apparatus further including:
- a clock generator providing a timing reference signal having a period that is greater than the period of the frame rate; and
- a timing difference detector detecting a timing difference from time to time between a specific time in the frame and the timing reference signal.

7. The apparatus of claim 6, wherein the detected timing difference is transmitted to another node within the network.

8. The apparatus of claim 6, wherein the timing difference is detected by counting the number of clock pulses between a fixed reference point in the timing reference signal and the start of a frame.

9. The apparatus of claim 8, wherein the frequency of the timing reference signal is relatively prime when compared with the frame timing and the line clock pulse rate.

10. The apparatus of claim 6, wherein the frame timing has a frequency of about 8 KHz and the timing reference signal has a frequency of about 7.72 KHz or an integral submultiple of 7.72 KHz.

11. The apparatus of claim 6, wherein the node also regenerates a line clock signal received from a second node and regenerates a frame timing received from frames received from said second node, and the apparatus receives information from time to time indicating the difference in time between the start of a received frame and a timing reference signal at said second node, the apparatus further including:
- means responsive to the received timing difference for regenerating the timing signal at the first node.

12. The apparatus of claim 11, wherein the timing reference signal is generated based upon the regenerated timing signal.

13. The apparatus of claim 11, wherein the regenerated timing signal is the timing reference signal.

14. An apparatus for aiding the distribution of synchronization throughout a network comprised a plurality of nodes, each node regenerating a line clock at a predetermined frequency for receiving information from another node and each node receiving data according to frames having a period based upon the timing of the frame that is being received, the network further including transmission of information from a node related to the timing difference based upon the line clock between a predetermined portion of the frame and a timing reference signal, the apparatus further including:
- means for regenerating the line clock;
- means for regenerating timing associated with the received frame; and
- means for reconstructing the timing reference signal from the received information, the regenerated line clock and the regenerated frame timing.

15. The apparatus of claim 14, wherein the timing difference is detected by counting the number of regenerated clock pulses from the point of the frame timing based upon the received information.

16. The apparatus of claim 15, wherein the frequency of the timing reference signal is a relative prime when compared with the frame timing.

17. The apparatus of claim 14, wherein the frame timing has a frequency of about 8 KHz and the reference timing signal has a frequency of about 7.72 KHz or an integral submultiple of 7.72 KHz.

18. A method for generating synchronization throughout at least a part of a network based upon a master clock, each node of the at least part of the network having a node clock, whereby the phase timing of the node clock is synchronized to the timing of the master clock with network protocol including a predetermined timing relationship for the information being transmitted, the method including:
- measuring a timing difference between a reference signal and the predetermined timing relationship for the information being transmitted, the measurement being achieved with a predetermined granularity;
- transmitting the measurement to at least one other node where the measurement is received;
- synchronizing the clock of the node to the master clock using the received information, the timing relationship of the network and a filtering algorithm to provide a long term phase synchronization with the master clock at a resolution that is at least one order of magnitude smaller than the measuring granularity.

19. The apparatus of claim 18, wherein the means for reconstruction comprises a counter counting a predetermined number of line clock pulses from a predetermined portion of the frame based upon the transmitted information to thereby generate a pulse for the timing reference signal.

20. The method of claim 19, wherein the method further includes transmitting the measurement from a node having a master clock to a second node and the second node generating a timing signal in a phase lock relationship with the master clock based upon the transmitted information, the second node using the generated timing signal for making a timing difference measurement for transmission to a third node, the clock in the third node being maintained in synchronization with the first node based upon the transmitted timing information.

21. A method for transmitting timing information throughout at least part of a network, the network transmitting information during predetermined timing slots and a propagation delay existing in the network in the transmission of information between adjacent nodes, the method including:

making a timing measurement based upon a timing reference and a timing information being transmitted during a first timing slot;

transmitting the timing measurement during a subsequent timing slot;

recovering the timing measurement at a second node during the immediately subsequent timing slot such that the timing information at the second node is recovered two timing slots plus a propagation delay after the first timing slot.

22. A method of passing synchronization through a network comprised of a plurality of nodes communicating with each other at a predetermined frame rate, the nodes communicating with each other through frames having predefined starts and with a line clock, the communication occurring by transmitting the frame and the line clock between nodes, the method comprising:

generating at a first node a local timing reference signal;

determining with the line clock at the first node the timing difference between a predetermined time of the frame being transmitted and the local timing reference signal;

transmitting the timing difference to at least one other node in the network.

23. The method of claim 22, wherein the method further comprises:

determining the time of the frame and recovering the line clock at a second node coupled to the first node;

regenerating the timing reference signal based upon the transmitted timing difference.

24. The method of claim 22, wherein the frequency of the local timing reference signal is selected to minimize the occurrence of the metastable states in successive cycles of the timing signal.

25. The method of claim 22, wherein the network is a SONET network and the SONET network frame includes an F1 byte, the transmission of information indicating each timing difference occurs over multiple frames in the F1 byte.

26. An apparatus for aiding the distribution of synchronization throughout a network comprising a plurality of nodes, each node generating a line clock having clock pulses at a predetermined frequency for transmitting information to another node and each node transmitting according to frames having a period based upon the timing of the frame that is being transmitted, the apparatus further including:

a clock generator providing a timing reference signal; and a timing difference detector detecting a timing difference from time to time between a specific time in the frame being transmitted and the timing reference signal.

27. The apparatus of claim 26, wherein the detected timing difference is transmitted to another node within the network.

28. The apparatus of claim 26, wherein the timing difference is detected by counting the number of clock pulses between a fixed reference point in the timing reference signal and the start of a frame.

29. The apparatus of claim 28, wherein the frequency of the timing reference signal is relatively prime when compared with the frame timing and the line clock pulse rate.

30. The apparatus of claim 26, wherein the frame timing has a frequency of about 8 KHz and the timing reference signal has a frequency of about 7.72 KHz or an integral submultiple of 7.72 KHz.

31. The apparatus of claim 26, wherein the node also regenerates a line clock signal received from a second node and regenerates a frame timing received from frames received from said second node, and the apparatus receives information from time to time indicating the difference in time between the start is a received frame and a timing reference signal at said second node, the apparatus further including:

means responsive to the received timing difference for regenerating the timing signal at the first node.

32. The apparatus of claim 31, wherein the timing reference signal is generated based upon the regenerated timing signal.

33. The apparatus of claim 31, wherein the regenerated timing signal is the timing reference signal.

\* \* \* \* \*

UNITED STATES PATENT AND TRADEMARK OFFICE
CERTIFICATE OF CORRECTION

PATENT NO. : 5,828,670
DATED : October 27, 1998
INVENTOR(S) : Narasimha, et al.

It is certified that error appears in the above-identified patent and that said Letters Patent is hereby corrected as shown below:

Claim 4, line 1, replace "net work" (two words) with --network--.

Claim 5, line 8, delete the first occcurence of "at".

Claim 31, line 6, replace "is" with --of--.

Signed and Sealed this

Sixteenth Day of March, 1999

Attest:

Q. TODD DICKINSON

Attesting Officer

Acting Commissioner of Patents and Trademarks